United States Patent
Hancock, Jr. et al.

(10) Patent No.: US 12,122,705 B2
(45) Date of Patent: Oct. 22, 2024

(54) TEXTURED GLASS ARTICLES AND METHODS OF MAKING SAME

(71) Applicant: Corning Incorporated, Corning, NY (US)

(72) Inventors: Robert Randall Hancock, Jr., Corning, NY (US); Yuhui Jin, Painted Post, NY (US); Aize Li, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 151 days.

(21) Appl. No.: 17/462,873

(22) Filed: Aug. 31, 2021

(65) Prior Publication Data

US 2023/0060615 A1 Mar. 2, 2023

(51) Int. Cl.
*C03C 15/00* (2006.01)
*G06F 1/16* (2006.01)

(52) U.S. Cl.
CPC ............ *C03C 15/00* (2013.01); *G06F 1/1626* (2013.01); *C03C 2201/32* (2013.01); *C03C 2204/08* (2013.01)

(58) Field of Classification Search
None
See application file for complete search history.

(56) References Cited

FOREIGN PATENT DOCUMENTS

| CN | 1884206 A | * | 12/2006 | ............... C03C 1/08 |
|---|---|---|---|---|
| CN | 111233339 A | | 6/2020 | |
| CN | 112062475 A | | 12/2020 | |
| WO | 2010/117673 A1 | | 10/2010 | |
| WO | 2016/040151 A1 | | 3/2016 | |
| WO | WO-2020060955 A1 | * | 3/2020 | ............... B32B 3/00 |
| WO | 2021/113196 A1 | | 6/2021 | |
| WO | 2022/051280 A1 | | 3/2022 | |

OTHER PUBLICATIONS

English machine translation CN1884206A (2006).*
International Search Report and Written Opinion of the International Searching Authority; PCT/US2021/048454; mailed on Jun. 8, 2022, 13 pages; European Patent Office.

* cited by examiner

*Primary Examiner* — Kenneth J Stachel

(57) ABSTRACT

A textured glass article includes: a body comprising an aluminosilicate glass comprising greater than or equal to 16 wt % $Al_2O_3$, the body having at least a first surface; a plurality of dendritic surface features extending from the first surface, each of the plurality of dendritic surface features comprising a base on the first surface and a surface feature size at the base greater than or equal to 10 μm and less than or equal to 350 μm; and a transmittance haze greater than or equal to 50%.

7 Claims, 8 Drawing Sheets

TEXTURED GLASS ARTICLES AND METHODS OF MAKING SAME

FIELD

The present specification generally relates to glass articles and, in particular, to glass articles having an enhanced tactile impression.

TECHNICAL BACKGROUND

Aluminosilicate glass articles may exhibit superior ion-exchangeability and drop performance. Various industries, including the consumer electronics industry, desire textured materials with the same or similar strength and fracture toughness properties. However, conventional texturing processes may not produce the desired texture on certain aluminosilicate glass articles.

Accordingly, a need exists for an alternative method to produce aluminosilicate glass articles having an enhanced tactile impression.

SUMMARY

According to a first aspect A1, a textured glass article may comprise: a body comprising an aluminosilicate glass comprising greater than or equal to 16 wt % $Al_2O_3$, the body having at least a first surface; a plurality of dendritic surface features extending from the first surface, each of the plurality of dendritic surface features comprising a base on the first surface and a surface feature size at the base greater than or equal to 10 μm and less than or equal to 350 μm; and a transmittance haze greater than or equal to 50%.

A second aspect A2 includes the textured glass article according to the first aspect A1, wherein the surface feature size is greater than or equal to 10 μm and less than or equal to 100 μm.

A third aspect A3 includes the textured glass article according to the first aspect A1, wherein the surface feature size is greater than 100 μm and less than or equal to 350 μm.

A fourth aspect A4 includes the textured glass article according to any one of the first through third aspects A1-A3, wherein the textured glass article has a surface roughness Ra greater than or equal to 1 μm.

A fifth aspect A5 includes the textured glass article according to any one of the first through fourth aspects A1-A4, wherein the textured glass article comprises: greater than or equal to 48 wt % and less than or equal to 58 wt % $SiO_2$; greater than or equal to 20 wt % and less than or equal to 32 wt % $Al_2O_3$; greater than or equal to 0 wt % and less than or equal to 5 wt % $B_2O_3$; greater than or equal to 5 wt % and less than or equal to 12 wt % $Na_2O$; greater than or equal to 0 wt % and less than or equal to 0.2 wt % $K_2O$; greater than or equal to 0 wt % and less than or equal to 5 wt % $Li_2O$; and greater than or equal to 0 wt % and less than or equal to 3 wt % MgO.

An sixth aspect A6 includes the textured glass article according to any one of the first through fifth aspects A1-A5, wherein the aluminosilicate glass comprises: greater than or equal to 52 wt % and less than or equal to 62 wt % $SiO_2$; greater than or equal to 16 wt % and less than or equal to 28 wt % $Al_2O_3$; greater than or equal to 0 wt % and less than or equal to 5 wt % $B_2O_3$; greater than or equal to 8 wt % and less than or equal to 13 wt % $Na_2O$; greater than or equal to 0 wt % and less than or equal to 0.2 wt % $K_2O$; greater than or equal to 0 wt % and less than or equal to 4 wt % $Li_2O$; and greater than or equal to 0 wt % and less than or equal to 1.5 wt % MgO.

A seventh aspect A7 includes the textured glass article according to any one of the first through sixth aspects A1-A6, wherein the textured glass article is an electronic device back cover.

According to an eighth aspect A8, a method of forming a textured glass article may comprise: contacting an aluminosilicate glass article with an etchant, wherein the aluminosilicate glass article comprises greater than or equal to 16 wt % $Al_2O_3$ and has a first surface and the etchant comprises a pH greater than 3.0; washing the aluminosilicate glass article; and drying the aluminosilicate glass article to form the textured glass article, the textured glass article comprising a plurality of dendritic surface features extending from the first surface, each of the plurality of dendritic surface features comprising a base on the first surface and a surface feature size at the base greater than or equal to 10 μm and less than or equal to 350 μm, wherein the textured glass article has a transmittance haze greater than or equal to 50%.

A ninth aspect A9 includes the method according to the eighth aspect A8, wherein the pH of the etchant is greater than or equal to 4.0.

A tenth aspect A10 includes the method according to the ninth aspect A9, wherein the pH of the etchant is greater than or equal to 5.0.

An eleventh aspect includes the method according to the tenth aspect A10, wherein the surface feature size is greater than 100 μm and less than or equal to 350 μm.

A twelfth aspect A12 includes the method according to any one of the eighth through eleventh aspects A8-A11, wherein contacting the aluminosilicate glass article with the etchant generates a greater amount of aluminum-based precipitate than silicon-based precipitate.

A thirteenth aspect A13 includes the method according to any one of the eighth through twelfth aspects A8-A12, wherein the etchant comprises: greater than or equal to 5 wt % and less than or equal to 40 wt % of a salt; and greater than or equal to 1 wt % and less than or equal to 50 wt % of an acid.

A fourteenth aspect A14 includes the method according to the thirteenth aspect A13, wherein the salt comprises ammonium chloride, ammonium fluoride, ammonium bifluoride, ammonium sulfate, ammonium nitrate, potassium sulfate, potassium chloride, potassium fluoride, potassium bifluoride, potassium nitrate, sodium chloride, sodium fluoride, sodium bifluoride, or combinations.

A fifteenth aspect A15 includes the method accordingly to the thirteenth aspect A13 or the fourteenth aspect A14, wherein the acid comprises hydrochloric acid, hydrofluoric acid, nitric acid, sulfuric acid, oxalic acid, acetic acid, sodium bisulfate, or combinations thereof A sixteenth aspect A16 includes the method according to any one of the eighth through fifteenth aspects A8-A15, wherein the etchant comprises: greater than or equal to 5 wt % and less than or equal to 20 wt % ammonium fluoride; greater than or equal to 1 wt % and less than or equal to 20 wt % hydrofluoric acid; and greater than or equal to 70 wt % and less than or equal to 90 wt % water.

A seventeenth aspect A17 includes the method according to any one of the eighth through fifteenth aspects A8-A15, wherein the etchant comprises: greater than or equal to 5 wt % and less than or equal to 20 wt % ammonium fluoride; greater than or equal to 5 wt % and less than or equal to 20 wt % hydrofluoric acid; and greater than or equal to 65 wt % and less than or equal to 85 wt % water.

An eighteenth aspect A18 includes the method according to any one of the eighth through fifteenth aspects A8-A15, wherein the etchant comprises: greater than or equal to 20 wt % and less than or equal to 40 wt % ammonium fluoride; greater than or equal to 25 wt % and less than or equal to 45 wt % nitric acid; greater than or equal to 1 wt % and less than or equal to 5 wt % hydrofluoric acid; and greater than or equal to 25 wt % and less than or equal to 45 wt % water.

A nineteenth aspect A19 includes the method according to any one of the eighth through fifteenth aspects A8-A15, wherein the etchant comprises: greater than or equal to 20 wt % and less than or equal to 40 wt % ammonium fluoride; greater than or equal to 5 wt % and less than or equal to 25 wt % nitric acid; greater than or equal to 5 wt % and less than or equal to 20 wt % hydrofluoric acid; and greater than or equal to 35 wt % and less than or equal to 55 wt % water.

A twentieth aspect A20 includes a consumer electronic device, comprising: a consumer electronic device, comprising: a housing having a front surface, a back surface, and side surfaces; and electrical components provided at least partially within the housing, the electrical components including at least a controller, a memory, and a display, the display being provided at or adjacent the front surface of the housing; wherein the back surface of the housing includes the textured glass article according to the first aspect A1.

Additional features and advantages of the textured glass articles described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
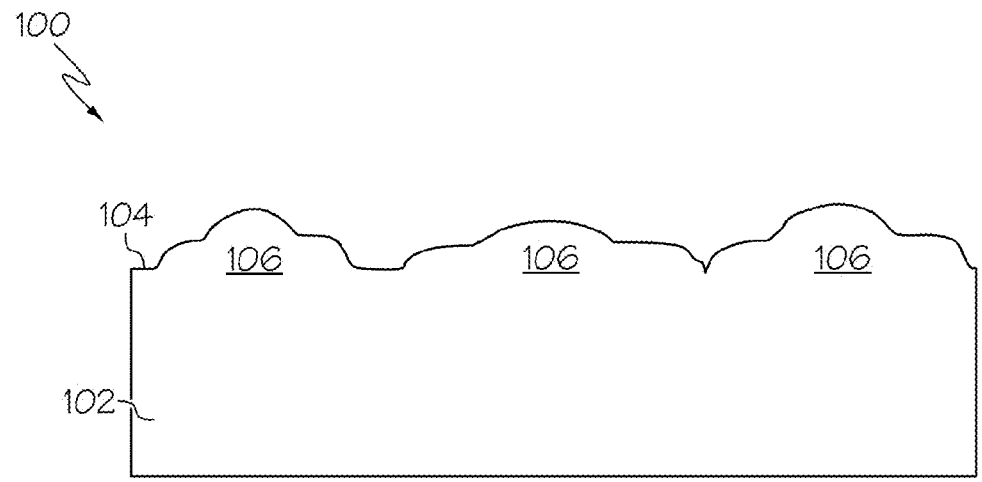
FIG. 1 schematically depicts a perspective view of a textured glass article, according to one or more embodiments shown and described herein.

Reference will now be made in detail to various embodiments of textured glass articles having an enhanced tactile impression. According to embodiments, a textured glass article includes: a body comprising an aluminosilicate glass comprising greater than or equal to 16 wt % $Al_2O_3$, the body having at least a first surface; a plurality of dendritic surface features extending from the first surface, each of the plurality of dendritic surface features comprising a base on the first surface and a surface feature size at the base greater than or equal to 10 μm and less than or equal to 350 μm; and a transmittance haze greater than or equal to 50%. Various embodiments of textured glass articles and methods of making the same will be described herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

In the embodiments of the glass compositions described herein, the concentrations of constituent components (e.g., $SiO_2$, $Al_2O_3$, and the like) are specified in weight percent (wt %) on an oxide basis, unless otherwise specified.

X-ray diffraction (XRD) spectrum, as described herein, is measured with a D8 ENDEAVOR X-ray Diffraction system with a LYNXEYE XE-T detector manufactured by Bruker Corporation (Billerica, MA).

Confocal images, as described herein, are obtained using Leica DCM8 microscope, with associated LeicaSCAN software package, at 50× magnification. Surface feature size and surface roughness of the textured glass articles are measured using the confocal images. Transmittance haze, transmission, and 450 nm reflectance of the textured glass articles are analyzed using Ci7800 Spectrophotometer courtesy of Pantone x-Rite, with associated iColor analysis program.

"Surface feature size" refers to the mean longest dimension across the cross section of the base of the 10 largest surface features from three different locations in the confocal image. Accordingly, the longest dimension of the 10 largest surface features from three different locations are measured. The mean value of the 30 feature size measurements is calculated to obtain the surface feature size of the textured glass article.

"Surface roughness ('Ra')," as described herein, refers to the surface texture of a textured glass article quantified by the arithmetic average of the absolute values of the profile height deviations from the mean line, recorded within the evaluation length. Values reported herein are reported in microns, or μm, unless otherwise expressly stated.

"Transmittance haze," as described herein, refers to the ratio of transmitted light scattered at an angle greater than 2.5° from normal to all transmitted light over the total transmission. Transmittance haze, as described herein, is measured with a wavelength range of 360 nm to 750 nm at a thickness of 0.8 mm, unless otherwise indicated.

"Transmission," as used herein, refers to the average of transmission made within a given wavelength range. In the embodiments described herein, "transmission" is reported over the wavelength range of 360 nm to 750 nm at a thickness of 0.8 mm, unless otherwise indicated.

"450 nm reflectance," as used herein, refers to the reflectance made at the wavelength of 450 nm at a thickness of 0.8 mm, unless otherwise indicated.

"Polyhedral," when used to describe the structure of a surface feature on a textured glass article, refers to a three-dimensional shape with flat polygonal faces, straight edges.

"Dendritic," when used to describe the structure of a surface feature on a textured glass article, refers to a branching structure.

"Nitric acid," as described herein, refers to stock nitric acid solution, which contains 70 wt % nitric acid.

"Hydrofluoric acid," as described herein, refers to stock hydrofluoric acid solution, which contains 49 wt % hydrofluoric acid.

Etchants have been used to achieve textured surfaces on glass articles. For example, aluminosilicate glasses, which exhibit superior ion-exchangeability and drop performance, may be etched to produce textured materials with the same or similar strength and fracture toughness properties. However, simply etching an aluminosilicate glass comprising greater than or equal to 16 wt % $Al_2O_3$ may not produce the desired enhanced tactile impression.

Disclosed herein are textured glass articles and texturing methods which mitigate the aforementioned problems such that aluminosilicate glasses comprising greater than or equal to 16 wt % $Al_2O_3$ (which exhibit superior ion-exchangeability and drop performance) may be treated to produce the desired texture. Specifically, textured glass articles disclosed herein comprise an aluminosilicate glass having dendritic surface features that have an enhanced tactile impression. To produce the dendritic surface features, the aluminosilicate glass article comprising greater than or equal to 16 wt % $Al_2O_3$ is etched with an etchant having a pH greater than 3.0 to preferentially generate an aluminum-based precipitate, which leads to dendritic surface features, and minimizes the silicon-based precipitate, which leads to polyhedral surface features.

Figure 2:
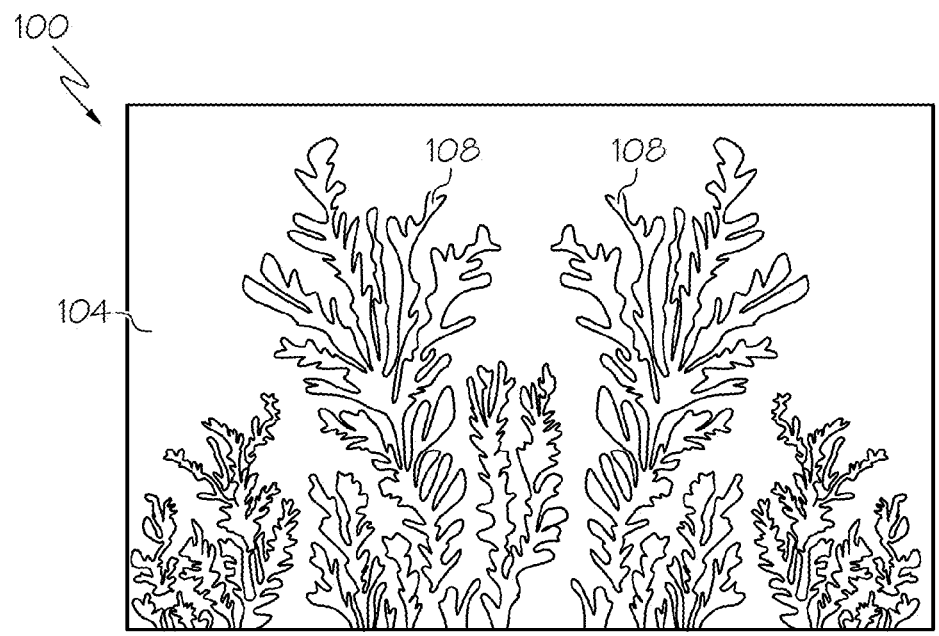
FIG. 2 schematically depicts a plan view, respectively, of a textured glass article, according to one or more embodiments shown and described herein.

Referring now to FIGS. 1 and 2, the textured glass articles 100 described herein have a body 102 including an aluminosilicate glass comprising greater than or equal to 16 wt % $Al_2O_3$. In embodiments, the aluminosilicate glass article may comprise greater than or equal to 48 wt % and less than or equal to 58 wt % $SiO_2$; greater than or equal to 20 wt % and less than or equal to 32 wt % $Al_2O_3$; greater than or equal to 0 wt % and less than or equal to 5 wt % $B_2O_3$; greater than or equal to 5 wt % and less than or equal to 12 wt % $Na_2O$; greater than or equal to 0 wt % and less than or equal to 0.2 wt % $K_2O$; greater than or equal to 0 wt % and less than or equal to 5 wt % $Li_2O$; and greater than or equal to 0 wt % and less than or equal to 3 wt % MgO. In embodiments, the aluminosilicate glass article may comprise greater than or equal to 52 wt % and less than or equal to 62 wt % $SiO_2$; greater than or equal to 16 wt % and less than or equal to 28 wt % $Al_2O_3$; greater than or equal to 0 wt % and less than or equal to 5 wt % $B_2O_3$; greater than or equal to 8 wt % and less than or equal to 13 wt % $Na_2O$; greater than or equal to 0 wt % and less than or equal to 0.2 wt % $K_2O$; greater than or equal to 0 wt % and less than or equal to 4 wt % $Li_2O$; and greater than or equal to 0 wt % and less than or equal to 1.5 wt % MgO.

The body 102 includes at least a first surface 104. A plurality of dendritic surface features 106 extend from the first surface 104. Each dendritic surface feature 106 includes a base 108 on the first surface 104.

In embodiments, a surface feature size at the base 108 may be greater than or equal to 10 μm and less than or equal to 350 μm. In embodiments, the surface feature size at the base 108 may be greater than or equal to 10 μm, greater than or equal to 25 μm, greater than or equal to 50 μm, greater than or equal to 75 μm, or even greater than or equal to 100 μm. In embodiments, the surface feature size at the base 108 may be less than or equal to 350 μm, less than or equal to 300, or even less than or equal to 250 μm. In embodiments, the surface feature size at the base 108 may be greater than or equal to 10 μm and less than or equal to 350 μm, greater than or equal to 10 μm and less than or equal to 300 μm, greater than or equal to 10 μm and less than or equal to 250 μm, greater than or equal to 25 μm and less than or equal to 350 µm, greater than or equal to 25 µm and less than or equal to 300 µm, greater than or equal to 25 µm and less than or equal to 250 µm, greater than or equal to 50 µm and less than or equal to 350 µm, greater than or equal to 50 µm and less than or equal to 300 µm, greater than or equal to 50 µm and less than or equal to 250 µm, greater than or equal to 75 µm and less than or equal to 350 µm, greater than or equal to 75 µm and less than or equal to 300 µm, greater than or equal to 75 µm and less than or equal to 250 µm, greater than or equal to 100 µm and less than or equal to 350 µm, greater than or equal to 100 µm and less than or equal to 300 µm, or even greater than or equal to 100 µm and less than or equal to 250 µm, or any and all sub-ranges formed from any of these endpoints.

The structure of each dendritic surface feature 106 aids in achieving the desired enhanced tactile impression.

In embodiments, the textured glass article 100 may have a surface roughness Ra greater than or equal to 1 µm or even greater than or equal to 1.25 µm. In embodiments, the textured glass article 100 may have a surface roughness Ra less than or equal to 3 µm or even less than or equal to 2 µm. In embodiments, the textured glass article 100 may have a surface roughness Ra greater than or equal to 1 µm and less than or equal to 3 µm, greater than or equal to 1 µm and less than or equal to 2 µm, greater than or equal to 1.25 µm and less than or equal to 3 µm, or even greater than or equal to 1.25 µm and less than or equal to 2 µm, or any and all sub-ranges formed from any of these endpoints.

The transmittance haze of the textured glass article 100 may be correlated to the surface roughness Ra in that a relatively greater transmittance haze may imply that the textured glass article 100 has a relatively greater surface roughness Ra. In embodiments, the textured glass article 100 may have a transmittance haze greater than or equal to 50%, greater than or equal to 60%, greater than or equal to 70%, greater than or equal to 80%, or even greater than or equal to 90%. In embodiments, the textured glass article 100 may have a transmittance haze less than or equal to 100% or even less than or equal to 98%. In embodiments, the textured glass article 100 may have a transmittance haze greater than or equal to 50% and less than or equal to 100%, greater than or equal to 50% and less than or equal to 98%, greater than or equal to 60% and less than or equal to 100%, greater than or equal to 60% and less than or equal to 98%, greater than or equal to 70% and less than or equal to 100%, greater than or equal to 70% and less than or equal to 98%, greater than or equal to 80% and less than or equal to 100%, greater than or equal to 80% and less than or equal to 98%, greater than or equal to 90% and less than or equal to 100%, or even greater than or equal to 90% and less than or equal to 98%, or any and all sub-ranges formed from any of these endpoints.

In embodiments, a relatively high transmission of the textured glass article 100 allows for ink to be placed on the back of the textured glass article 100 (i.e., opposite the textured side) to provide a different color or pattern or to include text (e.g., company brand). In embodiments, the textured glass article 100 may have a transmission greater than or equal to 75% or even greater than or equal to 85%. In embodiments, the textured glass article 100 may have a transmission less than or equal to 99% or even less than or equal to 97%. In embodiments, the textured glass article 100 may have a transmission greater than or equal to 75% and less than or equal to 99%, greater than or equal to 75% and less than or equal to 97%, 85% and less than or equal to 99%, or even greater than or equal to 85% and less than or equal to 97%, or any and all sub-ranges formed from any of these endpoints.

In embodiments, the textured glass article 100 may have a 450 nm reflectance greater than or equal to 1% or even greater than or equal to 5%. In embodiments, the textured glass article 100 may have a 450 nm reflectance less than or equal to 35%, less than or equal to 25%, or even less than or equal to 15%. In embodiments, the textured glass article 100 may have a 450 nm reflectance greater than or equal to 1% and less than or equal to 35%, greater than or equal to 1% and less than or equal to 25%, greater than or equal to 1% and less than or equal to 15%, greater than or equal to 5% and less than or equal to 35%, greater than or equal to 5% and less than or equal to 25%, or even greater than or equal to 5% and less than or equal to 15%, or any and all sub-ranges formed from any of these endpoints.

In embodiments, each of the plurality of dendritic surface features 106 may comprise a polyhedral structure extending from base 108 of the dendritic surface feature 106 and away from the first surface 104. Polyhedral surface features alone may not provide enhanced tactile impression. However, when formed in combination with the dendritic surface features 106, the desired enhanced tactile impression may be achieved.

Figure 3:
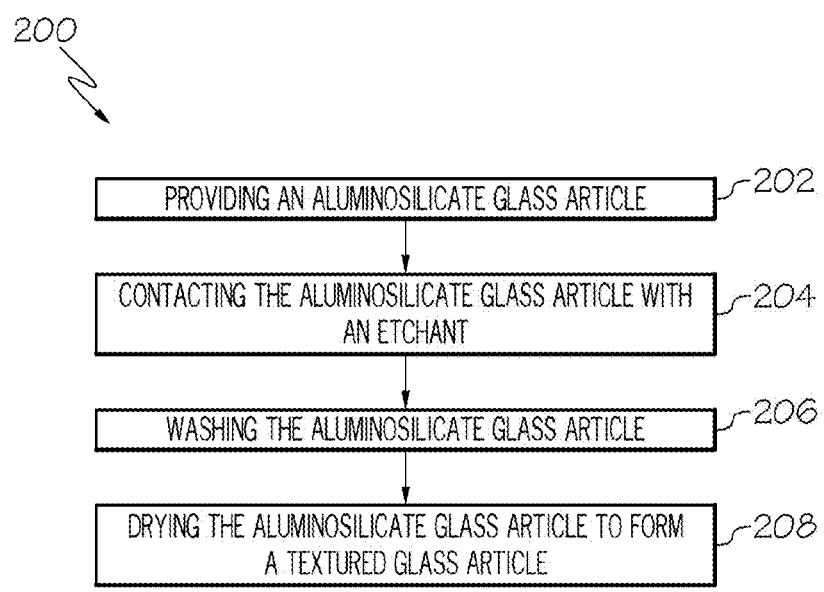
FIG. 3 is a flow diagram of method of forming a textured glass article according to one or more embodiments described herein.
Figure 4:
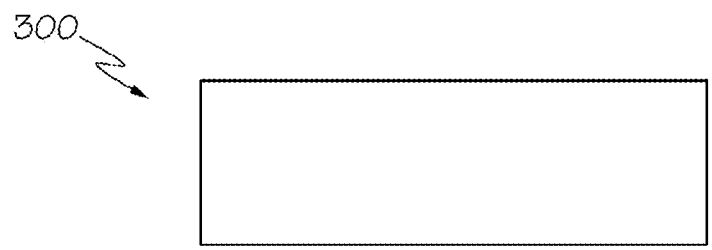
FIG. 4 schematically depicts a step of an etching process, according to one or more embodiments shown and described herein.
Figure 5:
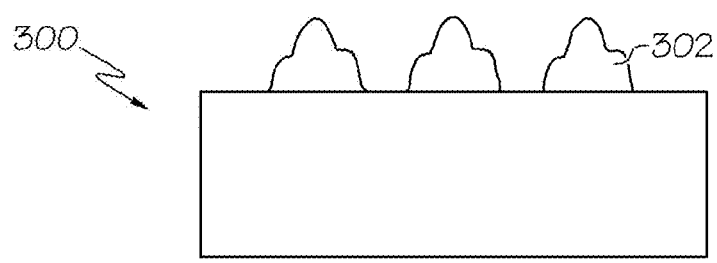
FIG. 5 schematically depicts another step of the etching process, according to one or more embodiments shown and described herein.

Referring now to FIG. 3, a method of forming a textured glass article by a chemical etching process is shown at 200. At block 202 and as shown in FIG. 4, an aluminosilicate glass article 300 comprising greater than or equal to 16 wt % $Al_2O_3$ is initially provided. The aluminosilicate glass article 300 may be in the form of a plate with a first surface and a second surface opposite and generally parallel to the first surface. In embodiments, the aluminosilicate glass article 300 may be pre-cleaned with a cleaning solution including potassium hydroxide, hydrofluoric acid, hydrochloric acid, or combinations thereof. Referring back to FIG. 3 at block 204 and as shown in FIG. 5, the aluminosilicate glass article 300 is contacted with an etchant. The etchant reacts with the aluminosilicate glass article 300, which causes silicate and/or aluminate species to be released from aluminosilicate glass article 300. The silicate and/or aluminate species combine with elements of the etchant to produce precipitates. If these precipitates have a low solubility in the etchant, then they deposit on the surface of the aluminosilicate glass article 300 to form crystal seeds 302 (e.g., salt crusts).

Figure 6:
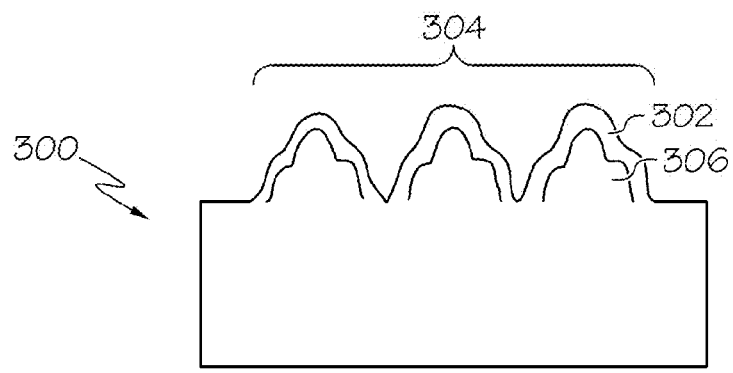
FIG. 6 schematically depicts another step of the etching process, according to one or more embodiments shown and described herein.

As shown in FIG. 6, as the etchant continues to react with the aluminosilicate glass article 300, the crystal seeds 302 grow. Because the crystal seeds 302 are insoluble in the etchant, the crystal seeds 302 serve as in-situ mask 304. The mask 304 seals portions of the surface of the aluminosilicate glass article 300. Glass is etched away around the mask 304 to generate surface features 306. The shape of the surface features 306 may be determined by the shape of the mask 304, which may be altered by varying the composition of the etchant and/or varying the length of time the etchant contacts the aluminosilicate glass article 300.

Figure 7:
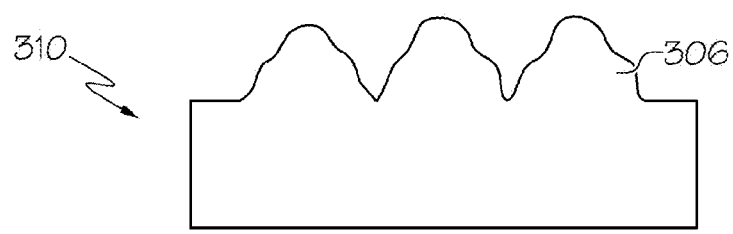
FIG. 7 schematically depicts another step of the etching process, according to one or more embodiments shown and described herein.

Referring back to FIG. 3 at block 206 and as shown in FIG. 7, the aluminosilicate glass article 300 is washed to remove the etchant and crystal seeds 302 from the surface and then dried to form the textured glass article 310 having surface features 306. In embodiments, the etchant is rinsed off of the aluminosilicate glass article 300 with deionized (DI) water. In embodiments, crystal seeds 302 adhering to the aluminosilicate glass article 300 may be removed by, for example, a scrubber sponge. Referring back to FIG. 3 at block 208, in embodiments, the aluminosilicate glass article

300 is dried in ambient condition. Alternatively, the aluminosilicate glass article may be 300 heated to dry the glass article.

To produce the desired enhanced tactile impression on an aluminosilicate glass article comprising greater than or equal to 16 wt % $Al_2O_3$, the etchants described herein are prepared such that the etchant preferentially generates an aluminum-based precipitate and minimizes the amount of silicon-based precipitate. Aluminum-based precipitates (e.g., metal aluminofluoride ($MAlF_5$)) lead to dendritic surface features. Silicon-based precipitates (e.g., metal fluorosilicate ($MSiF_6$)) lead to polyhedral surface features. Because a silicon-based precipitate has higher solubility at higher pH (e.g., at pH values greater than 3.0), etchants with a higher pH are capable of generating a greater amount of aluminum-based precipitates than silicon-based precipitates, which results in the desired enhanced tactile impression. While not wishing to be bound by theory, increasing the pH of the etchant increases the amount of aluminum-base precipitates, thereby producing larger, dendritic structures.

Accordingly, in embodiments, the etchants described herein have a pH greater than 3.0. In embodiments, the etchants may have a pH greater than 3.0, greater than or equal to 3.5, greater than or equal to 4.0, greater than or equal to 4.5, greater than or equal to 5.0, or even greater than or equal to 5.5.

In embodiments, the etchant may comprise a salt and an acid, as described in further detail herein.

The salt present in the etchant acts as a crystallization promoter encouraging the formation of crystal seeds. In embodiments, the salt may comprise ammonium chloride, ammonium fluoride, ammonium bifluoride, ammonium sulfate, ammonium nitrate, potassium sulfate, potassium chloride, potassium fluoride, potassium bifluoride, potassium nitrate, sodium chloride, sodium fluoride, sodium bifluoride, or combinations. The amount of the salt in the etchant should be sufficiently high (e.g., greater than or equal to 5 wt %) to ensure the formation of the crystal seeds. The amount of salt may be limited (e.g., less than or equal to 40 wt %) to reduce or prevent undissolved salt that may precipitate out once solubility is reached. Undissolved salt may etch differently than the etchant and may cause a lack of uniformity across the textured glass surface. In embodiments, the etchant may comprise greater than or equal to 5 wt % and less than or equal to 40 wt % of the salt. In embodiments, the amount of the salt in the etchant may be greater than or equal to 5 wt %, greater than or equal to 10 wt %, greater than or equal to 20 wt %, or even greater than or equal to 25 wt %. In embodiments, the amount of the salt in the etchant may be less than or equal to 40 wt %, less than or equal to 35 wt %, less than or equal to 30 wt %, less than or equal to 25 wt %, or even less than or equal to 20 wt %. In embodiments, the amount of the salt in the etchant may be greater than or equal to 5 wt % and less than or equal to 40 wt %, greater than or equal to 5 wt % and less than or equal to 35 wt %, greater than or equal to 5 wt % and less than or equal to 30 wt %, greater than or equal to 5 wt % and less than or equal to 25 wt %, greater than or equal to 5 wt % and less than or equal to 20 wt %, greater than or equal to 10 wt % and less than or equal to 40 wt %, greater than or equal to 10 wt % and less than or equal to 35 wt %, greater than or equal to 10 wt % and less than or equal to 30 wt %, greater than or equal to 10 wt % and less than or equal to 25 wt %, greater than or equal to 10 wt % and less than or equal to 20 wt %, greater than or equal to 20 wt % and less than or equal to 40 wt %, greater than or equal to 20 wt % and less than or equal to 35 wt %, greater than or equal to 20 wt % and less than or equal to 30 wt %, greater than or equal to 20 wt % and less than or equal to 25 wt %, greater than or equal to 25 wt % and less than or equal to 40 wt %, greater than or equal to 25 wt % and less than or equal to 35 wt %, or even greater than or equal to 25 wt % and less than or equal to 30 wt %, or any and all sub-ranges formed from any of these endpoints.

The acid present in the etchant functions to dissolve the components of the glass network of the aluminosilicate glass article and form the dendritic surface features. In embodiments, the acid may comprise hydrochloric acid, hydrofluoric acid, nitric acid, sulfuric acid, oxalic acid, acetic acid, bisulfate salt (e.g., sodium bisulfate) or combinations thereof. The amount of the acid in the etchant should be sufficiently high (e.g., greater than or equal to 1 wt %) to ensure etching of glass and the formation of the textured glass article The amount of acid may be limited (e.g., less than or equal to 50 wt %) to ensure the dendritic surface features are produced. When an excessive amount of acid is added, the dendritic surface features may be corroded to a smaller size, losing their enhanced tactile impression. In embodiments, the etchant may comprise greater than or equal to 1 wt % and less than or equal to 50 wt % of the acid. In embodiments, the amount of the acid in the etchant may be greater than or equal to 1 wt %, greater than or equal to 5 wt %, greater than or equal to 10 wt %, greater than or equal to 20 wt %, or even greater than or equal to 25 wt %. In embodiments, the amount of the acid in the etchant may be less than or equal to 50 wt %, less than or equal to 45 wt %, less than or equal to 40 wt %, or even less than or equal to 35 wt %. In embodiments, the amount of the acid in the etchant may be greater than or equal to 1 wt % and less than or equal to 50 wt %, greater than or equal to 1 wt % and less than or equal to 45 wt %, greater than or equal to 1 wt % and less than or equal to 40 wt %, greater than or equal to 1 wt % and less than or equal to 35 wt %, greater than or equal to 5 wt % and less than or equal to 50 wt %, greater than or equal to 5 wt % and less than or equal to 45 wt %, greater than or equal to 5 wt % and less than or equal to 40 wt %, greater than or equal to 5 wt % and less than or equal to 35 wt %, greater than or equal to 10 wt % and less than or equal to 50 wt %, greater than or equal to 10 wt % and less than or equal to 45 wt %, greater than or equal to 10 wt % and less than or equal to 40 wt %, greater than or equal to 10 wt % and less than or equal to 35 wt %, greater than or equal to 5 wt % and less than or equal to 50 wt %, greater than or equal to 20 wt % and less than or equal to 45 wt %, greater than or equal to 20 wt % and less than or equal to 40 wt %, greater than or equal to 20 wt % and less than or equal to 35 wt %, greater than or equal to 25 wt % and less than or equal to 50 wt %, greater than or equal to 25 wt % and less than or equal to 45 wt %, greater than or equal to 25 wt % and less than or equal to 40 wt %, or even greater than or equal to 25 wt % and less than or equal to 35 wt %, or any and all sub-ranges formed from any of these endpoints.

In embodiments, the etchant may further include a solvent. In embodiments, the solvent may comprise water, an acid (e.g., hydrochloric acid and/or hydrofluoric acid), or combinations thereof. In embodiments, the amount of the solvent in the etchant may be greater than or equal to 25 wt % or even greater than or equal to 35 wt %. In embodiments, the amount of the solvent in the etchant may be less than or equal to 90 wt %, less than or equal to 85 wt %, less than or equal to 75 wt %, less than or equal to 65 wt %, or even less than or equal to 55 wt %. In embodiments, the amount of the solvent in the etchant may be greater than or equal to 25 wt % and less than or equal to 90 wt %, greater than or equal to 25 wt % and less than or equal to 85 wt %, greater than or equal to 25 wt % and less than or equal to 75 wt %, greater than or equal to 25 wt % and less than or equal to 65 wt %, greater than or equal to 25 wt % and less than or equal to 55 wt %, greater than or equal to 35 wt % and less than or equal to 90 wt %, greater than or equal to 35 wt % and less than or equal to 85 wt %, greater than or equal to 35 wt % and less than or equal to 75 wt %, greater than or equal to 35 wt % and less than or equal to 65 wt %, or even greater than or equal to 35 wt % and less than or equal to 55 wt %, or any and all sub-ranges formed from any of these endpoints.

In embodiments, the etchant is prepared by mixing the components and stirring for at least 12 hours (i.e., aging). After stirring, the supernatant is decanted and used as the etchant.

In embodiments, the etchant may comprise greater than or equal to 5 wt % and less than or equal to 20 wt % ammonium fluoride; greater than or equal to 1 wt % and less than or equal to 20 wt % hydrofluoric acid; and greater than or equal to 70 wt % and less than or equal to 90 wt % water.

In embodiments, the etchant may comprise greater than or equal to 5 wt % and less than or equal to 20 wt % ammonium fluoride; greater than or equal to 5 wt % and less than or equal to 20 wt % hydrofluoric acid; and greater than or equal to 65 wt % and less than or equal to 85 wt % water.

In embodiments, the etchant may comprise greater than or equal to 20 wt % and less than or equal to 40 wt % ammonium fluoride; greater than or equal to 25 wt % and less than or equal to 45 wt % nitric acid; greater than or equal to 1 wt % and less than or equal to 5 wt % hydrofluoric acid; and greater than or equal to 25 wt % and less than or equal to 45 wt % water.

In embodiments, the etchant may comprise greater than or equal to 20 wt % and less than or equal to 40 wt % ammonium fluoride; greater than or equal to 5 wt % and less than or equal to 25 wt % nitric acid; greater than or equal to 5 wt % and less than or equal to 20 wt % hydrofluoric acid; and greater than or equal to 35 wt % and less than or equal to 55 wt % water.

Figure 8:
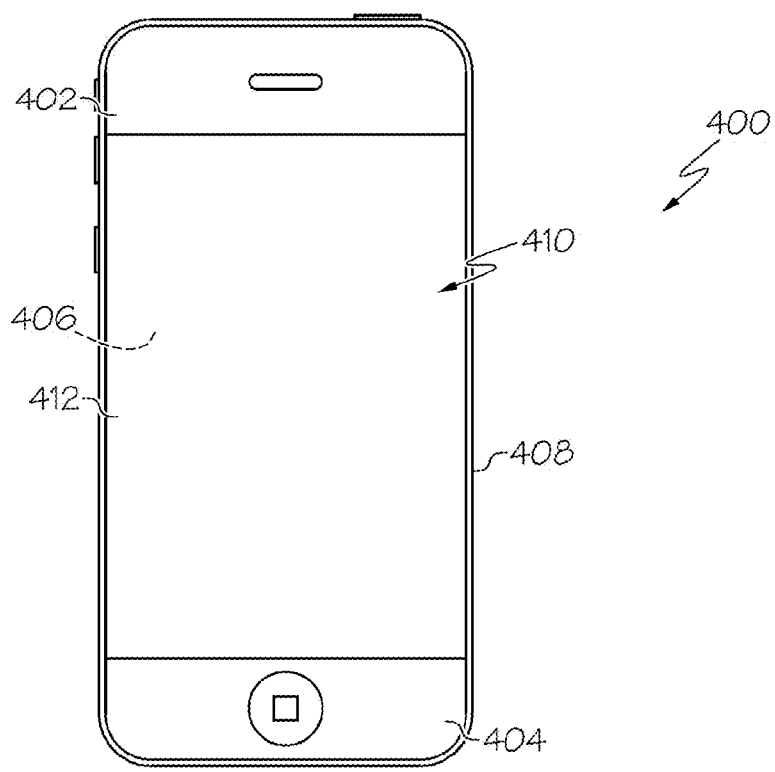
FIG. 8 is a plan view of an exemplary electronic device incorporating any of the textured glass articles, according to one or more embodiments shown and described herein.
Figure 9:
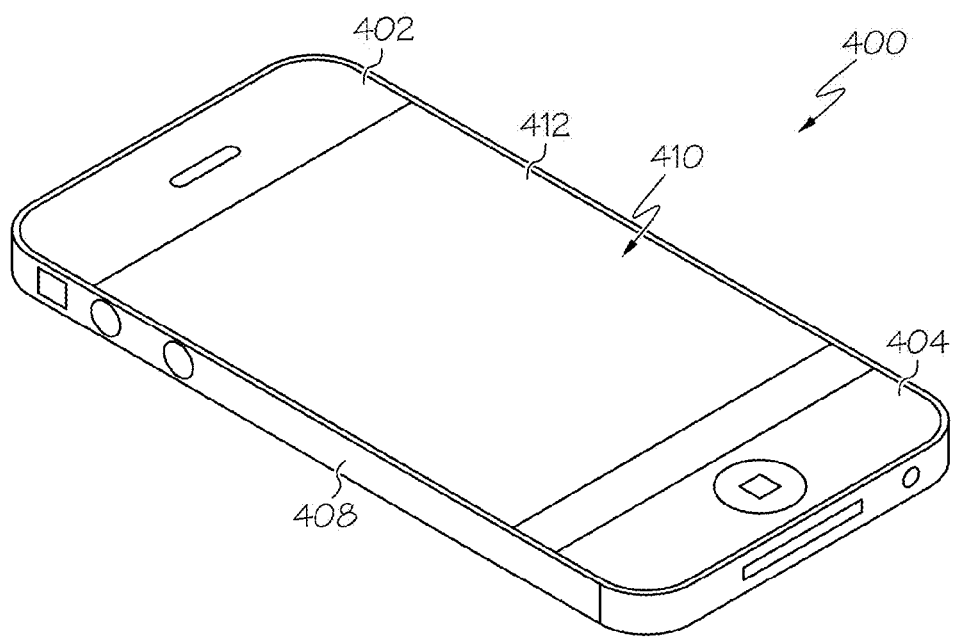
FIG. 9 is a perspective view of the exemplary electronic device of FIG. 8.
Figure 10:
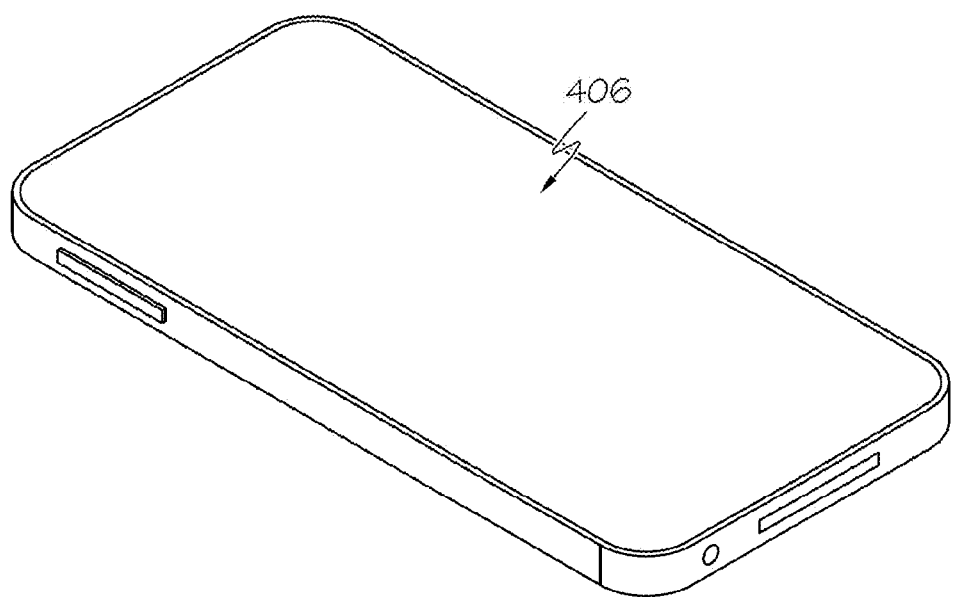
FIG. 10 is a perspective view of the exemplary electronic device of FIG. 9.

The textured glass articles described herein may be used for a variety of applications including, for example, back cover applications in consumer or commercial electronic devices such as smartphones, tablet computers, personal computers, ultrabooks, televisions, and cameras. An exemplary article incorporating any of the textured glass articles disclosed herein is shown in FIGS. 8-10. Specifically, FIGS. 8-10 show a consumer electronic device 400 including a housing 402 having front 404, back 406, and side surfaces 408; electrical components (not shown) that are at least partially inside or entirely within the housing and including at least a controller, a memory, and a display 410 at or adjacent to the front surface of the housing; and a cover substrate 412 at or over the front surface of the housing such that it is over the display. In embodiments, a portion of housing 402, such as the back 406, may include any of the textured glass articles disclosed herein.

Examples

In order that various embodiments be more readily understood, reference is made to the following examples, which illustrate various embodiments of the textured glass articles described herein.

Glass articles having Glass Compositions 1 and 2 as shown in Table 1 were treated as described below.

The compositions of Glass Articles 1 and 2 treated as described below are shown in Table 1. Note that reference to "Glass Article 1" and "Glass Article 2" refers to a glass article that has the respective composition shown in Table 1. References to Glass Articles 1 and 2 do not refer to the same Glass Articles 1 and 2, respectively, that were treated multiple times with the various etchants.

TABLE 1

|  | Glass Article | |
|---|---|---|
|  | 1 | 2 |
| $SiO_2$ (wt %) | 56.54 | 52.71 |
| $Al_2O_3$ (wt %) | 23.89 | 27.22 |
| $B_2O_3$ (wt %) | — | 4.39 |
| $Na_2O$ (wt %) | 9.94 | 8.08 |
| $K_2O$ (wt %) | — | 0.10 |
| $Li_2O$ (wt %) | 2.73 | 3.44 |
| MgO (wt %) | — | 0.72 |
| ZnO (wt %) | 1.40 | — |
| $P_2O_5$ (wt %) | 5.18 | 3.12 |
| $SnO_2$ (wt %) | 0.10 | 0.10 |
| $TiO_2$ (wt %) | — | 0.12 |
| $Fe_2O_3$ (wt %) | — | — |

Table 2 shows the composition of ammonium salt Example Etchants 1-4. Table 3 shows the respective treatment times and respective properties of the resultant textured glass articles. Comparative Textured Glass Articles $CG_A$ and $CG_B$ were formed from Glass Articles 1 and 2, respectively. Example Textured Glass Articles $EG_A$-$EG_D$ were formed by treating Glass Articles 1 and 2 with Example Etchants 1-4. The glass articles were 50 mm×50 mm×1.1 mm slides. Prior to treatment with the respective ammonium etchant, the glass articles were pre-cleaned using 4 wt % SemiClean KG detergent (produced by Yokohama Oils and Fats Industry Co., Ltd.) at 60° C. with sonication for 2 minutes, rinsed with DI water, and dried in a desiccator. The glass articles were pre-etched with 10 vol % HF/20 vol % HCl for 2 minutes at 22° C., rinsed with DI water, shook to remove excess, and transferred to the respective etchant. The glass articles were treated with the respective etchant by vertically dipping and holding the glass article in the etchant for the period of time shown in Table 3. The glass articles were then removed from the etchant, rinsed with DI water, and dried at 110° C.

TABLE 2

| Etchant | Example Etchant 1 | Example Etchant 2 | Example Etchant 3 | Example Etchant 4 |
|---|---|---|---|---|
| $HNO_3$ (wt %) | — | — | 33 | 15 |
| HF (wt %) | 5 | 10 | 2 | 10 |
| $NH_4F$ (wt %) | 10 | 10 | 30 | 30 |
| $H_2O$ (wt %) | 85 | 80 | 35 | 45 |
| pH | 4.8 | 4.3 | 6.1 | 5.6 |

TABLE 3

|  | Textured Glass | | |
|---|---|---|---|
|  | $CG_A$ | $EG_A$ | $EG_B$ |
| Glass Article | 2 | 2 | 2 |
| Etchant | — | Example Etchant 2 | Example Etchant 3 |
| Treatment Time (min) | — | 8 | 8 |
| Surface Feature Size (μm) | 0 | 77 ± 24 | 54 ± 13 |
| Surface Roughness (μm) | 0 | 1.5 ± 0.1 | 1.5 ± 0.1 |
| Transmittance Haze (%) | 0 | 77.2 ± 0.7 | 100 ± 0 |
| Transmission (%) | 96.83 ± 0.01 | 95.88 ± 0.05 | 87.11 ± 0.1 |

TABLE 3-continued

| 450 nm Reflectance (%) | 8.01 ± 0.01 | 10.5 ± 0.3 | 28.2 ± 0.3 |
|---|---|---|---|

| | Textured Glass | |
|---|---|---|
| | $EG_C$ | $EG_D$ |
| Glass Article | 1 | 1 |
| Etchant | Example Etchant 4 | Example Etchant 5 |
| Treatment Time (min) | 4 | 4 |
| Surface Feature Size (μm) | 117 ± 58 | 292 ± 53 |
| Surface Roughness (μm) | 1.4453 | 1.4070 |
| Transmittance Haze (%) | 98 | 100 |
| Transmission (%) | 92 | 88 |
| 450 nm Reflectance (%) | 8 | 8 |

Etchant 1 was prepared by mixing 5 wt % hydrofluoric acid, 10 wt % ammonium fluoride, and 85 wt % water. After stirring for 12 hours, the supernatant was decanted in a polyethylene vial for treatment of Glass Article 2.

Etchant 2 was prepared by mixing by mixing 10 wt % hydrofluoric acid, 10 wt % ammonium fluoride, and 80 wt % water. After stirring for 12 hours, the supernatant was decanted in a polyethylene vial for treatment of Glass Article 2.

Figure 11:
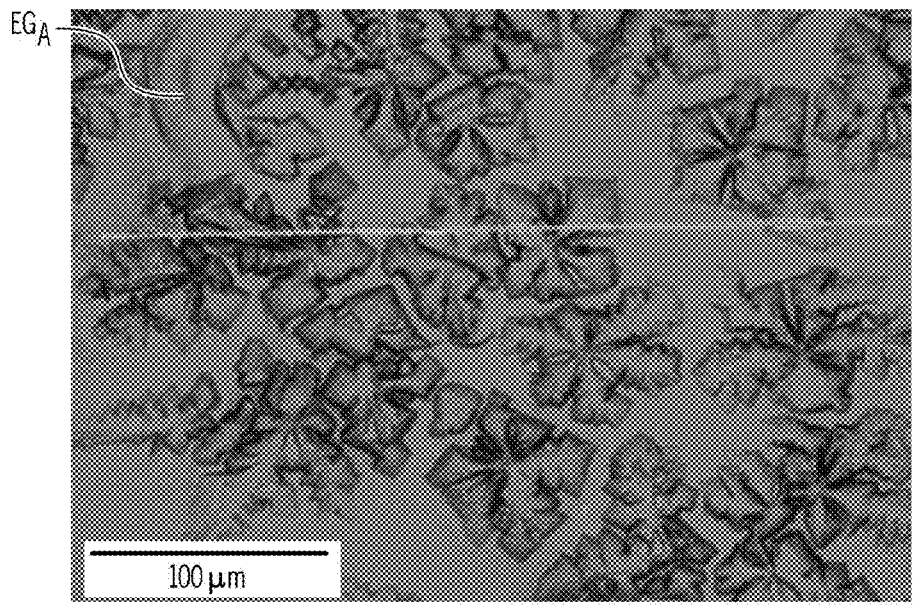
FIG. 11 is a confocal image with a magnification of 50× of a textured glass article, according to one or more embodiments shown and described herein.
Figure 12:
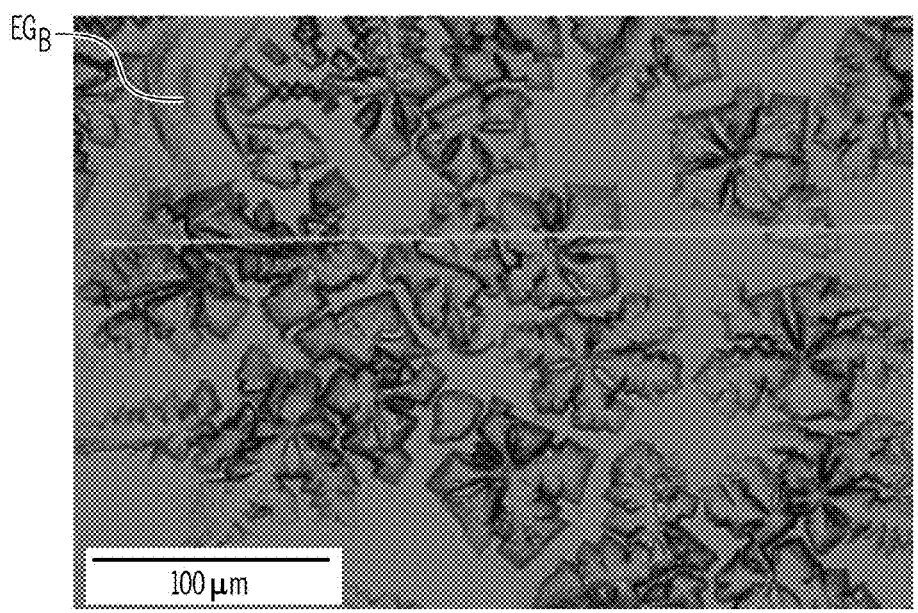
FIG. 12 is a confocal image with a magnification of 50× of a textured glass article, according to one or more embodiments shown and described herein.

Treating Glass Article 2 with Example Etchants 4 and 5 resulted in Example Textured Glass Articles $EG_A$ and $EG_B$, respectively, the surfaces of which are shown in FIGS. 11 and 12. As shown, Example Textured Glass Articles $EG_A$ and $EG_B$ had large, dendritic crystal structures.

The resulting surface features of Example Textured Glass Articles $EG_A$ and Example Textured Glass Articles $EG_B$ had a surface feature size of 77±24 μm and 54±13 μm, respectively. Example Textured Glass $EG_A$ had a transmittance haze of 77.2±0.7%, a surface roughness of 1.5±0.1 μm, a transmission of 95.88±0.05%, and a 450 nm reflectance of 10.5±0.3%. Example Textured Glass Article $EG_B$ had a transmittance haze of 100±0%, a surface roughness of 1.5±0.1 μm, a transmission of 87.11±0.1%, and a 450 nm reflectance of 28.2±0.3%.

Etchant 3 was prepared by mixing by mixing 33 wt % nitric acid, 2 wt % hydrofluoric acid, 30 wt % ammonium fluoride, and 35 wt % water. After stirring for 12 hours, the supernatant was decanted in a polyethylene vial for treatment of Glass Article 1.

Etchant 4 was prepared by mixing by mixing 15 wt % nitric acid, 10 wt % hydrofluoric acid, and 30 wt % ammonium fluoride, and 45 wt % water. After stirring for 12 hours, the supernatant was decanted in a polyethylene vial for treatment of Glass Article 1.

Figure 13:
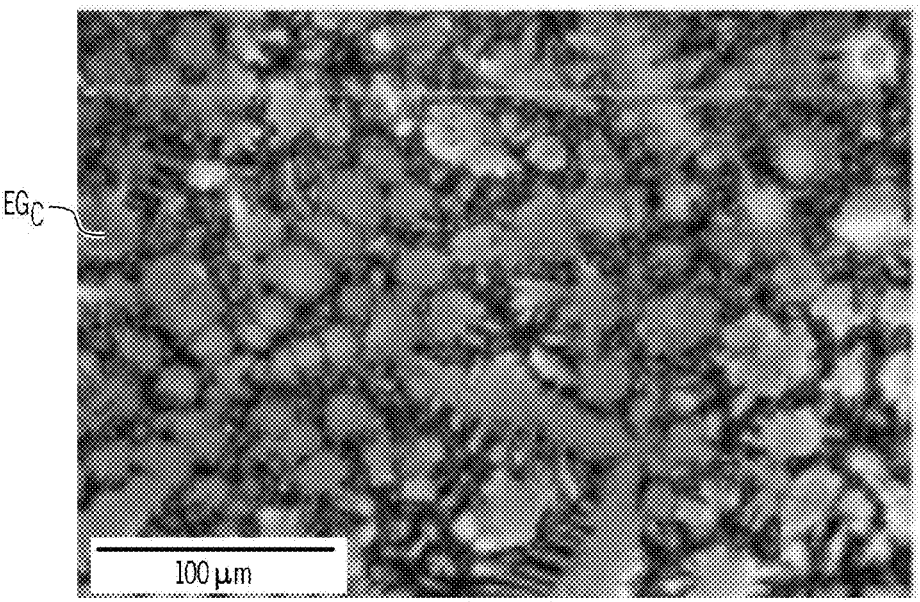
FIG. 13 is a confocal image with a magnification of 50× of a textured glass article, according to one or more embodiments shown and described herein.
Figure 14:
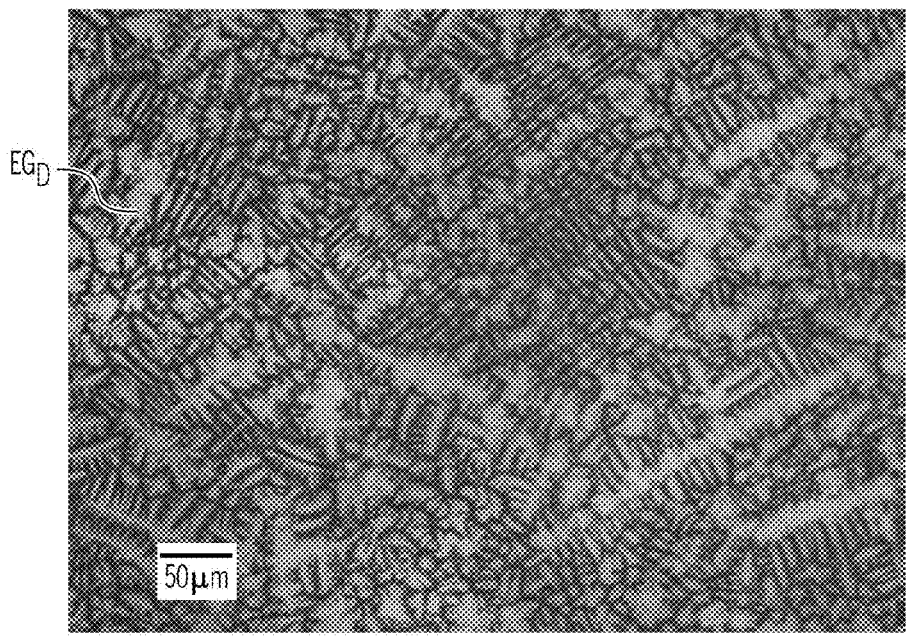
FIG. 14 is a confocal image with a magnification of 50× of a textured glass article, according to one or more embodiments shown and described herein.
Figure 15:
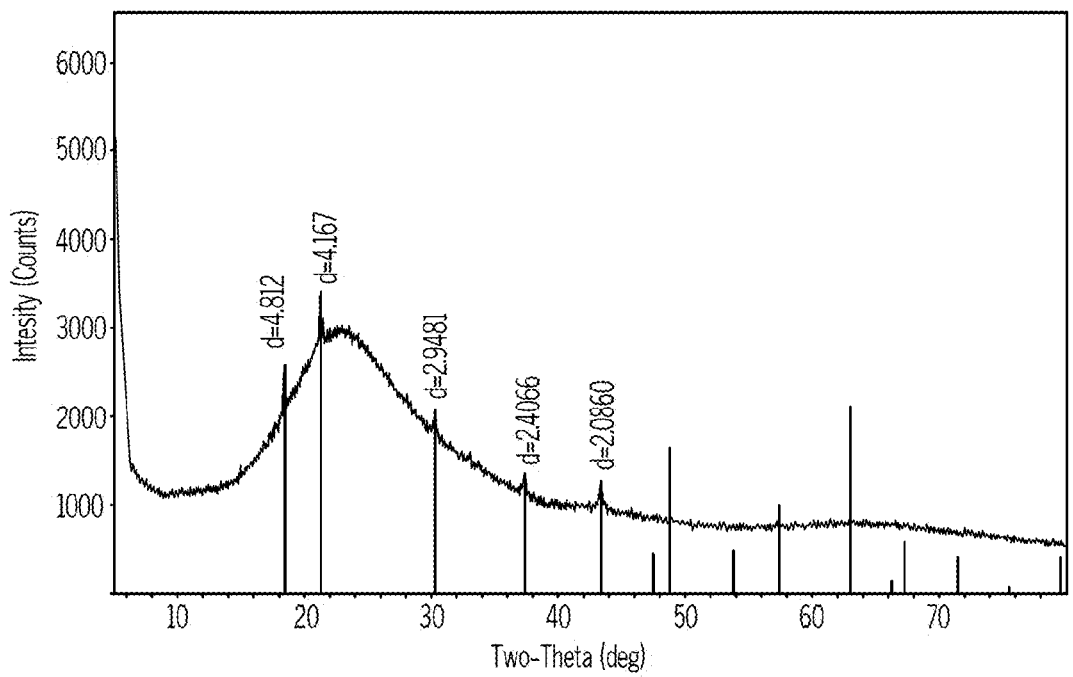
FIG. 15 is an XRD spectrum of a textured glass article, according to one or more embodiments shown and described herein.
Figure 16:
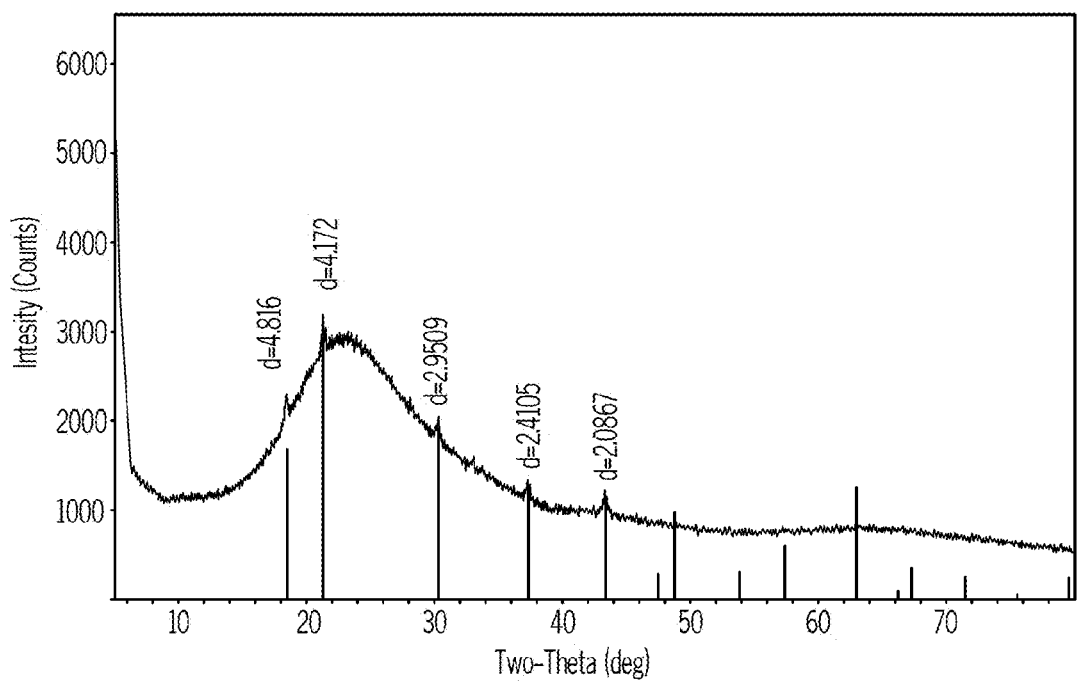
FIG. 16 is an XRD spectrum of a textured glass article, according to one or more embodiments shown and described herein.

Treating Glass Article 1 with Example Etchants 3 and 4 resulted in Example Textured Glass Articles $EG_C$ and $EG_D$, respectively, the surfaces of which are shown in FIGS. 13 and 14, respectively. As shown, Example Textured Glass Articles $EG_D$ and $EG_E$ had dendritic crystal structures. Referring now to FIGS. 15 and 16, the XRD spectrum of Example Textured Glass Articles $EG_C$ and $EG_D$ included peaks indicating the presence of metal aluminofluoride-type precipitates (i.e., precipitates containing Al, such as ammonium hexafluoroaluminate) and did not include any peaks indicating the presence of fluorosilicate-type precipitates (i.e., precipitates containing $SiF_6$). Accordingly, the resulting etchant precipitate of Example Textured Glass Articles $EG_C$ and $EG_D$ included metal aluminofluoride-type precipitates and did not include any fluorosilicate-type precipitates. While not wishing to be bound by theory, the precipitation of only metal aluminofluoride-type precipitates resulted in the large, dendritic structures.

Example Textured Glass Article $EG_C$ had a transmittance haze of 98%, a surface roughness of 1.4453 μm, a transmission of 92%, and a 450 nm reflectance of 8%. Example Textured Glass Articles $EG_D$ had a transmittance haze of 100%, a surface roughness of 1.4070 μm, a transmission of 88%, and a 450 nm reflectance of 8%.

As exemplified by FIGS. 11-16 and Tables 2 and 3, treating an aluminosilicate glass article comprising greater than or equal to 16 wt % $Al_2O_3$ with an etchant having a pH greater than 3.0 results in the formation of dendritic surface features.

Referring back to Tables 2 and 3, utilizing Example Etchants 1 and 2, having a pH of 4.8 and 4.3, respectively, resulted in surface feature sizes of 77±24 μm and 54±13 μm, respectively. Utilizing Example Etchants 3 and 4, having a pH of 6.1 and 5.6, respectively, resulted in surface feature sizes of 117±58 μm and 292±53 μm, respectively. As exemplified by Tables 2 and 3, increasing the pH of the etchant results in larger, dendritic surface features. While not wishing to be bound by theory, increasing the pH of the etchant increases the amount of aluminofluoride-type precipitates, thereby producing larger, dendritic structures.

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A textured glass article comprising:
    a body comprising an aluminosilicate glass comprising greater than or equal to 16 wt % $Al_2O_3$, the body having at least a first surface;
    a plurality of dendritic surface features extending from the first surface, each of the plurality of dendritic surface features comprising a base on the first surface and a surface feature size at the base greater than or equal to 10 μm and less than or equal to 350 μm; and
    a transmittance haze greater than or equal to 50%,
    wherein the first surface of the textured glass article has a surface roughness Ra greater than or equal to 1.25 μm, the surface roughness being a surface texture of the textured glass article, including the plurality of dendritic surface features, quantified by an arithmetic average of absolute values of profile height deviations from a mean line, recorded within an evaluation length.

2. The textured glass article of claim 1, wherein the surface feature size at the base is greater than or equal to 10 μm and less than or equal to 100 μm.

3. The textured glass article of claim 1, wherein the surface feature size at the base is greater than 100 μm and less than or equal to 350 μm.

4. The textured glass article of claim 1, wherein the textured glass article comprises:
    greater than or equal to 48 wt % and less than or equal to 58 wt % $SiO_2$;
    greater than or equal to 20 wt % and less than or equal to 32 wt % $Al_2O_3$;
    greater than or equal to 0 wt % and less than or equal to 5 wt % $B_2O_3$;
    greater than or equal to 5 wt % and less than or equal to 12 wt % $Na_2O$;

greater than or equal to 0 wt % and less than or equal to 0.2 wt % $K_2O$;

greater than or equal to 0 wt % and less than or equal to 5 wt % $Li_2O$; and greater than or equal to 0 wt % and less than or equal to 3 wt % MgO.

5. The textured glass article of claim 1, wherein the aluminosilicate glass comprises:

greater than or equal to 52 wt % and less than or equal to 62 wt % $SiO_2$;

greater than or equal to 16 wt % and less than or equal to 28 wt % $Al_2O_3$;

greater than or equal to 0 wt % and less than or equal to 5 wt % $B_2O_3$;

greater than or equal to 8 wt % and less than or equal to 13 wt % $Na_2O$;

greater than or equal to 0 wt % and less than or equal to 0.2 wt % $K_2O$;

greater than or equal to 0 wt % and less than or equal to 4 wt % $Li_2O$; and greater than or equal to 0 wt % and less than or equal to 1.5 wt % MgO.

6. The textured glass article of claim 1, wherein the textured glass article is an electronic device back cover.

7. A consumer electronic device, comprising:

a housing having a front surface, a back surface, and side surfaces; and electrical components provided at least partially within the housing, the electrical components including at least a controller, a memory, and a display, the display being provided at or adjacent the front surface of the housing;

wherein the back surface of the housing includes the textured glass article of claim 1.

* * * * *